United States Patent
Schenk

(10) Patent No.: US 7,113,561 B2
(45) Date of Patent: Sep. 26, 2006

(54) CLOCK CONTROL CIRCUIT FOR CONTROLLING THE CLOCK PHASE OF A TRANSCEIVER

(75) Inventor: Heinrich Schenk, Munich (DE)

(73) Assignee: Infineon Technologies AG, Munich (DE)

( * ) Notice: Subject to any disclaimer, the term of this patent is extended or adjusted under 35 U.S.C. 154(b) by 781 days.

(21) Appl. No.: 10/351,900

(22) Filed: Jan. 27, 2003

(65) Prior Publication Data
US 2003/0147483 A1    Aug. 7, 2003

(30) Foreign Application Priority Data
Feb. 1, 2002   (DE)   ................. 102 04 190

(51) Int. Cl.
*H04L 7/00*    (2006.01)
(52) U.S. Cl. ..................... 375/355; 375/371
(58) Field of Classification Search ............... 375/355, 375/371, 373, 376; 379/406.01, 406.08; 370/286
See application file for complete search history.

(56) References Cited

U.S. PATENT DOCUMENTS 5,287,182 A * 2/1994 Haskell et al. .............. 348/500

FOREIGN PATENT DOCUMENTS

| CH | 668 874 A5 | 1/1989 |
| DE | 100 25 566 A1 | 12/2001 |
| EP | 0 144 067 A2 | 6/1985 |
| WO | WO 00/19655 | 4/2000 |

\* cited by examiner

*Primary Examiner*—Jay K. Patel
*Assistant Examiner*—David B. Lugo
(74) *Attorney, Agent, or Firm*—Jenkins, Wilson, Taylor & Hunt, P.A.

(57) ABSTRACT

A clock phase control circuit is provided for controlling the clock phase of a transceiver, having a sampling circuit for sampling an analog received signal with a sampling clock signal; an echo signal compensation circuit for compensating an echo signal which is produced by means of a transmit signal transmitted by the transceiver, it being possible to set the echo signal compensation circuit in an adaptive fashion as a function of a setting signal; a control circuit for generating a control signal for controlling the clock phase, which control signal specifies the phase deviation between the signal phase of the sampling clock signal and a setpoint signal phase of an ideal sampling clock signal; a loop filter for filtering the control signal; a phase counter for generating the sampling clock signal as a function of the filtered control signal described [sic]. An amplitude limiting circuit which limits the amplitude of the filtered control signal to a limiting value is provided between the loop filter and the phase counter, the limiting value depending on the setting signal for the echo signal compensation circuit.

16 Claims, 5 Drawing Sheets

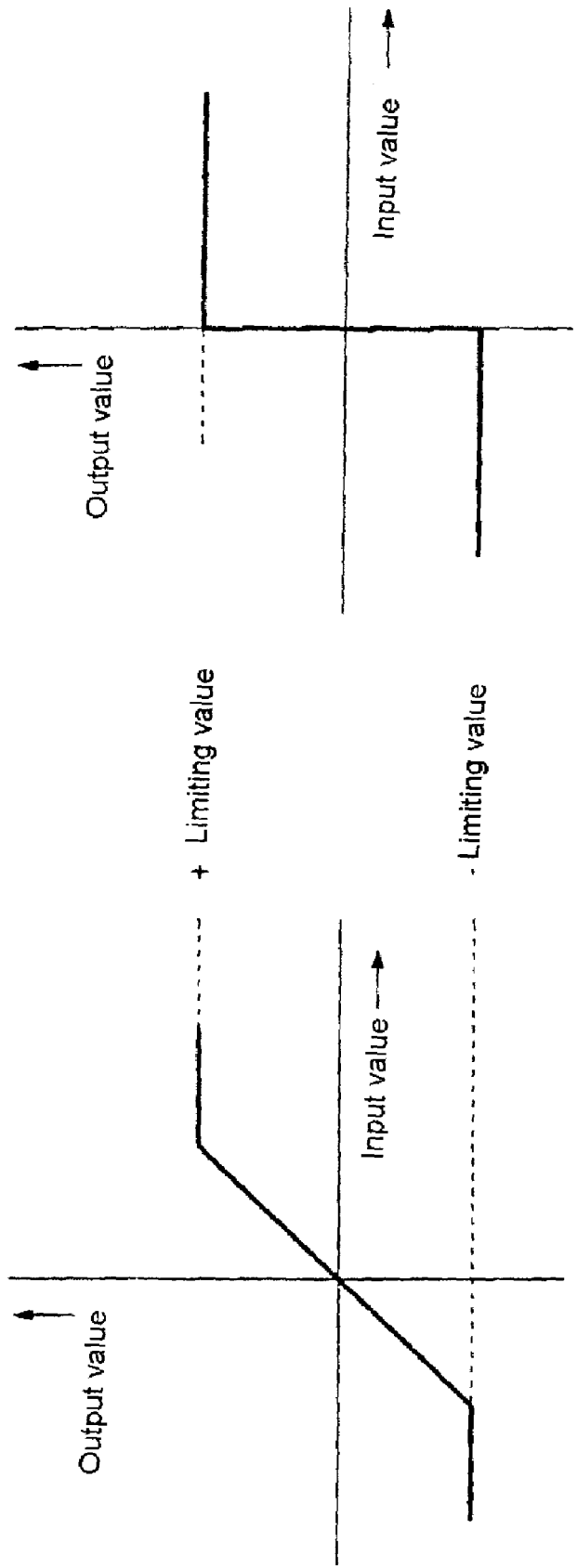

CLOCK CONTROL CIRCUIT FOR CONTROLLING THE CLOCK PHASE OF A TRANSCEIVER

TECHNICAL FIELD

The invention relates to a clock phase control circuit for controlling the clock phase of a transceiver according to the preamble of Patent claim 1.

BACKGROUND ART

FIG. 1 shows a data transmission system according to the prior art. A transceiver or a transmitter and receiver circuit receives transmit data from a data source and transmits this data to another transceiver as an analog transmit signal via a data transmission line. The data transmission line is, for example, a two-wire telephone line made of copper. The transceiver at the COT (central office terminal) end constitutes here the clock master, i.e. the transmitted transmit signal is emitted in synchronism with a clock signal of the transceiver at the COT end. The transceiver at the subscriber end RT forms what is referred to as the clock slave, i.e. the clock signal which is received at the reception end is used as its transmission clock.

When there is fault-free synchronization of the transceiver RT at the subscriber end, the clock frequency of the transmit signal coincides precisely with the clock frequency of the received signal. For this reason, the clock control circuit of the COT end transceiver only has to set the precise sampling phase in the receiver contained in it. The sampling phase depends here especially on the signal transit time of the transmission line.

In the data transmission system illustrated in FIG. 1, the data is transmitted simultaneously in both directions via the transmission line. It is therefore what is referred to as a full duplex data transmission system. The analog received signal of a transceiver is composed here of two signal components, namely of the transmit signal which is emitted by the transceiver at the opposite end, and of the signal component or the echo signal component which is fed in by the system's own transmitter device. The echo signal component constitutes signal interference here and is compensated in the receiver of the transceiver by means of an echo compensation circuit. The echo compensation circuit within the transceiver calculates the most precise estimated value possible for the echo signal component and subtracts it from the received signal.

FIG. 2 shows a conventional transceiver according to the prior art. The transceiver is composed of a transmit signal path and a received signal path. The transmit data or transmit data symbols are firstly fed to a transmission filter in the transmit signal path and then converted into an analog transmit signal by means of a digital-to-analog converter. The analog transmit signal is output to a hybrid network, after amplification with a driver circuit. The hybrid network is connected to the data transmission line.

The received analog signal is firstly filtered on the received signal path by means of an analog reception filter EF, and subsequently sampled. The sampling is carried out within a sampling circuit which is composed either of an analog-to-digital converter or, as illustrated in FIG. 2, of an analog-to-digital converter, an interpolation filter IF and a downstream interpolator. The analog-to-digital converter samples the analog received signal here with a freewheeling working clock signal. The sampled signal is then fed to the digital interpolation filter IF and interpolated by means of the interpolator. For this purpose, a controlled sampling clock signal is fed to the interpolator.

A subtractor circuit A which subtracts the estimated signal calculated by the echo compensation circuit from the sampled digital received signal by generating an echo-compensated digital received signal is connected downstream of the sampling circuit. The echo compensation circuit calculates the expected echo signal by means of the received transmission data symbols and subtracts said echo signal from the received signal. The echo compensation circuit can generally be set in an adaptive fashion. The echo compensation circuit is set in an adaptive fashion in accordance with the transmission function of the transmission line and the analog component, for example the transformer.

The difference signal which is formed by the subtractor A is fed to an amplitude control circuit AGC (Automatic Gain Control). The digital received signal whose amplitude is controlled is then equalized by means of an equalizer. The downstream decision element determines, from the equalized received signal, an estimated value for the transmit data symbol which is originally emitted by the other transceiver. The acquired transmit data symbol is output to the data sink for further data processing by the transceiver. A subtractor forms differences between the signal values upstream and downstream of the decision element. This fault signal or deviation signal is used as a setting signal for the echo compensation circuit. As described in EP 0 144 067 B1, either the difference signal which is formed by the subtractor A or the difference signal which is formed by the subtractor B can be used for the setting signal of the echo compensation circuit. Switching via between the two setting possibilities is carried out by means of a changevia switch.

In order to control the sampling phase of the received signal, a clock control criterion or a clock adjustment control signal is generated by means of a control circuit. The clock adjustment control signal specifies the phase deviation between the signal phase of the sampling clock signal and a desired setpoint signal phase of an ideal sampling clock signal. The clock control criterion or the clock control signal is a measure of the phase error between the ideal sampling clock in which there is a maximum signal-to-noise ratio, and the actual sampling clock. The clock adjustment control signal is generated from the sampled values upstream and downstream of the decision element (decision-fed-back control) and in addition from at least one of the coefficients of the linear equalizer EQ by means of the control circuit. The clock control criterion or the clock adjustment control signal is composed here of two components, namely of a signal component which is dependent on the sampled values upstream and downstream of the decision element and of a second signal component which is both dependent on one or more coefficients of the linear equalizer and on a suitably predefined phase reference signal value which is applied to the control circuit. When the sampling phase is set in an optimum way, the signal component which is dependent on the coefficient corresponds to the predefined phase reference signal value. The control signal therefore continuously generates a control variable which constitutes a measure of the deviation of the sampling phase from the setpoint phase.

The generated clock adjustment control signal is output to a digital loop filter. The output signal of the loop filter directly controls the sampling phase of the sampling clock signal for the sampling circuit. This is generally implemented using a phase counter. The counter reading of the phase counter defines here the phase difference between the transmission phase and the reception phase. In the steady state, the counter reading of the phase counter is largely constant in accordance with the constant phase difference between the phase of the transmit signal and the phase of the received signal. This constant phase difference depends on the signal transit time of the transmission line.

In the case of a clock phase control step within the transceiver at the COT end, the reception phase or the phase of the digital received signal is changed with respect to the phase of the transmit signal. Since the echo signal which is fed in is received with the phase of the transmit signal, each adjustment of the clock phase is also accompanied by a change in the echo signal which is sampled using the reception clock. The transceiver at the COT end therefore has a high degree of coupling of the clock phase control circuit to the echo compensation circuit EC. After the phase change, the echo compensation circuit is to be set again and the equalizer EQ must be re-synchronized again as far as possible.

The sampling phase control circuit of the transceiver according to the prior art illustrated in FIG. 2 is therefore relatively slow-acting so that the transceiver according to the prior art requires a relatively long synchronization time.

SUMMARY OF THE INVENTION

The object of the present invention is therefore to provide a clock phase control circuit for controlling the clock phase of a transceiver which minimizes the necessary synchronization time of the transceiver.

This object is achieved according to the invention by means of a clock phase control circuit having the features specified in Patent claim 1.

The invention provides a clock phase control circuit for controlling the clock phase of a transceiver, having a sampling circuit for sampling an analogue received signal with a sampling clock signal;

an echo signal compensation circuit for compensating an echo signal which is produced by means of a transmit signal transmitted by the transceiver, it being possible to set the echo signal compensation circuit in an adaptive fashion as a function of a setting signal;

a control circuit for generating a control signal for controlling the clock phase, which control signal specifies the phase deviation between the signal phase of the sampling clock signal and a setpoint signal phase of an ideal sampling clock signal;

a loop filter for filtering the control signal;

a phase counter for generating the sampling clock signal as a function of the filtered control signal, the clock phase control circuit according to the invention being characterized in that an amplitude limiting circuit is provided between the loop filter and the phase counter, which amplitude limiting circuit limits the amplitudes of the filtered control signal to a limiting value;

the limiting value depending on the setting signal for the echo signal compensation circuit.

In one preferred embodiment of the clock phase control circuit according to the invention, the sampling circuit contains an analog-to-digital converter for converting the analog received signal into a digital received signal, a digital interpolation filter for filtering the digital received signal, and an interpolator for interpolating the filtered digital received signal.

The analog-to-digital converter is preferably clocked here by means of a freewheeling working clock signal.

The interpolator is preferably clocked by means of the sampling clock signal.

A digital output signal of the echo signal compensation circuit is preferably subtracted from the filtered digital received signal by means of a subtractor in order to generate an echo-compensated digital received signal.

In one preferred embodiment of the clock phase control circuit according to the invention, an amplitude control circuit is provided for controlling the amplitude of the echo-compensated digital received signal.

In a further preferred embodiment of the clock phase control circuit according to the invention, an equalizer is provided for equalizing the echo-compensated digital received signal.

In one embodiment of the clock phase control circuit according to the invention, the equalizer is a linear equalizer.

In one alternative embodiment of the clock phase control circuit according to the invention the equalizer is a decision feedback equalizer.

A decision element which generates an estimated value for the received signal from the equalized digital received signal is connected downstream of the equalizer.

In one preferred embodiment of the clock phase control circuit according to the invention, a subtractor is provided which subtracts the generated estimated value from the equalized digital received signal in order to form a difference signal which is provided for setting the echo signal compensation circuit.

In one particularly preferred embodiment of the clock phase control circuit according to the invention, the control circuit calculates the phase deviation, averaged over time, between the phase of the sampled signal and a phase reference value in order to generate a phase deviation signal.

In addition, a controllable amplifier which amplifies the phase deviation signal as a function of an amplification setting signal in order to generate the setting signal for the echo compensation circuit is preferably provided here.

The amplification setting signal is preferably generated by the amplitude control circuit.

The limiting value for the amplitude limiting circuit is preferably calculated by means of a calculation circuit as a function of the setting signal for the echo compensation circuit, the limiting value being raised as the setting signal value increases.

In one particularly preferred embodiment of the clock phase control circuit according to the invention, a protection circuit for avoiding an incorrect synchronization is additionally provided, which protection circuit contains an absolute value calculation circuit for forming the absolute value of the difference signal, a downstream averaging filter and a monitoring control circuit, the monitoring control circuit actuating a phase counter in order to adjust the phase of the sampling signal by a predefined phase jump value if the difference signal averaged by means of the averaging filter does not drop below an adjustable threshold value during a specific time period.

BRIEF DESCRIPTION OF THE DRAWINGS

Further preferred embodiments of the amplitude phase control circuit according to the invention are described with reference to the appended figures in order to explain features which are essential to the invention. In said figures:

FIGS. 5a, 5b show embodiments of the amplitude limiting circuit of the clock phase control circuit according to the invention.

DETAILED DESCRIPTION OF THE INVENTION

Figure 1:
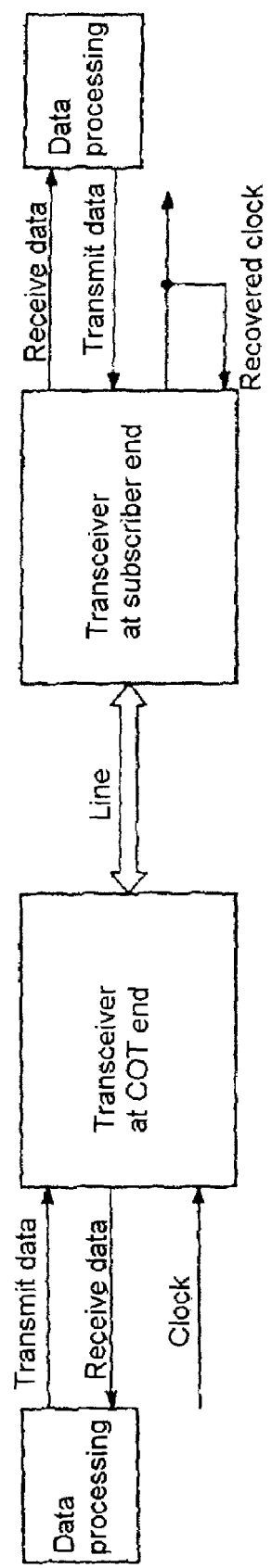
FIG. 1 shows a data transmission system according to the prior art.
Figure 2:
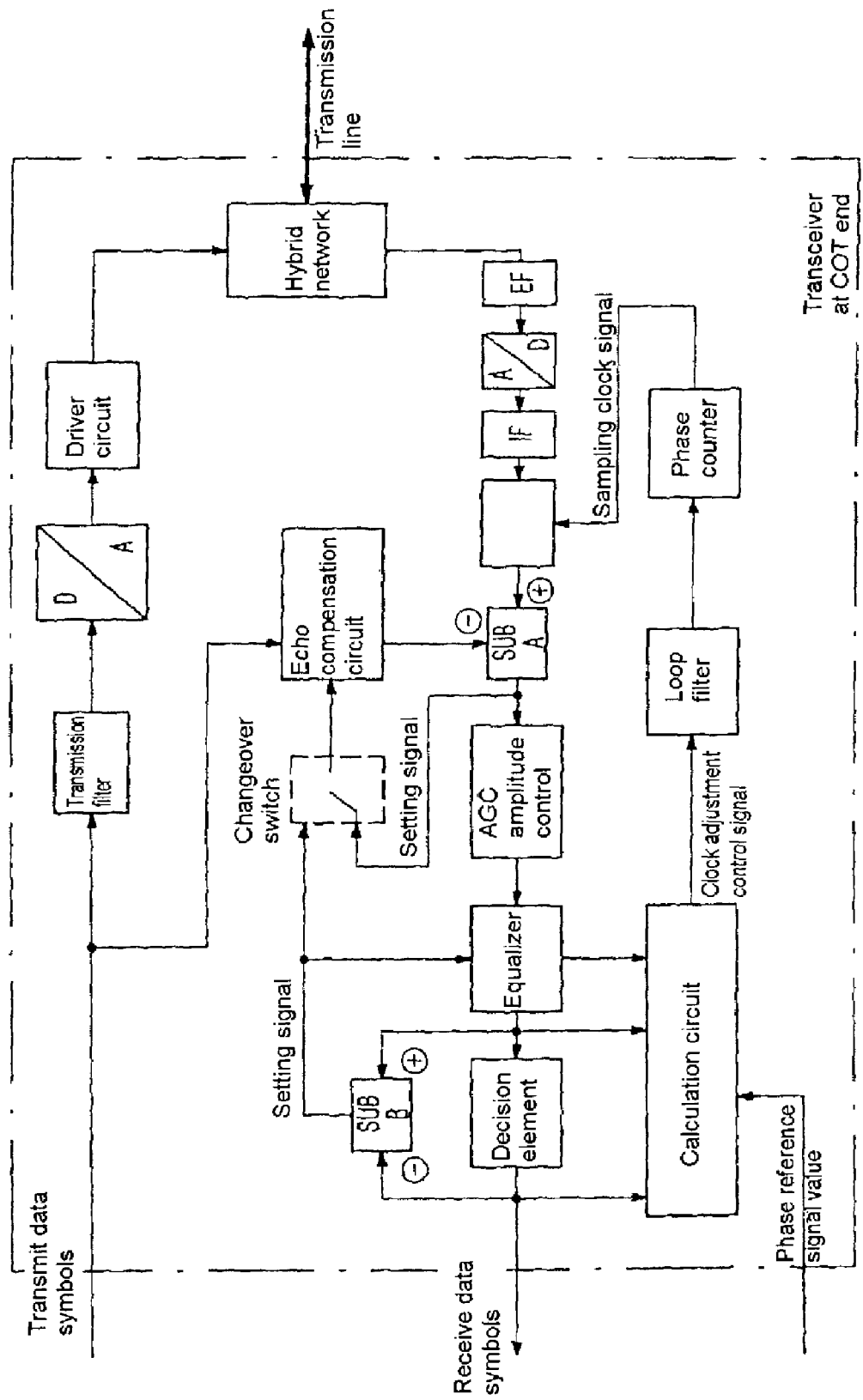
FIG. 2 shows a transceiver according to the prior art.
Figure 3:
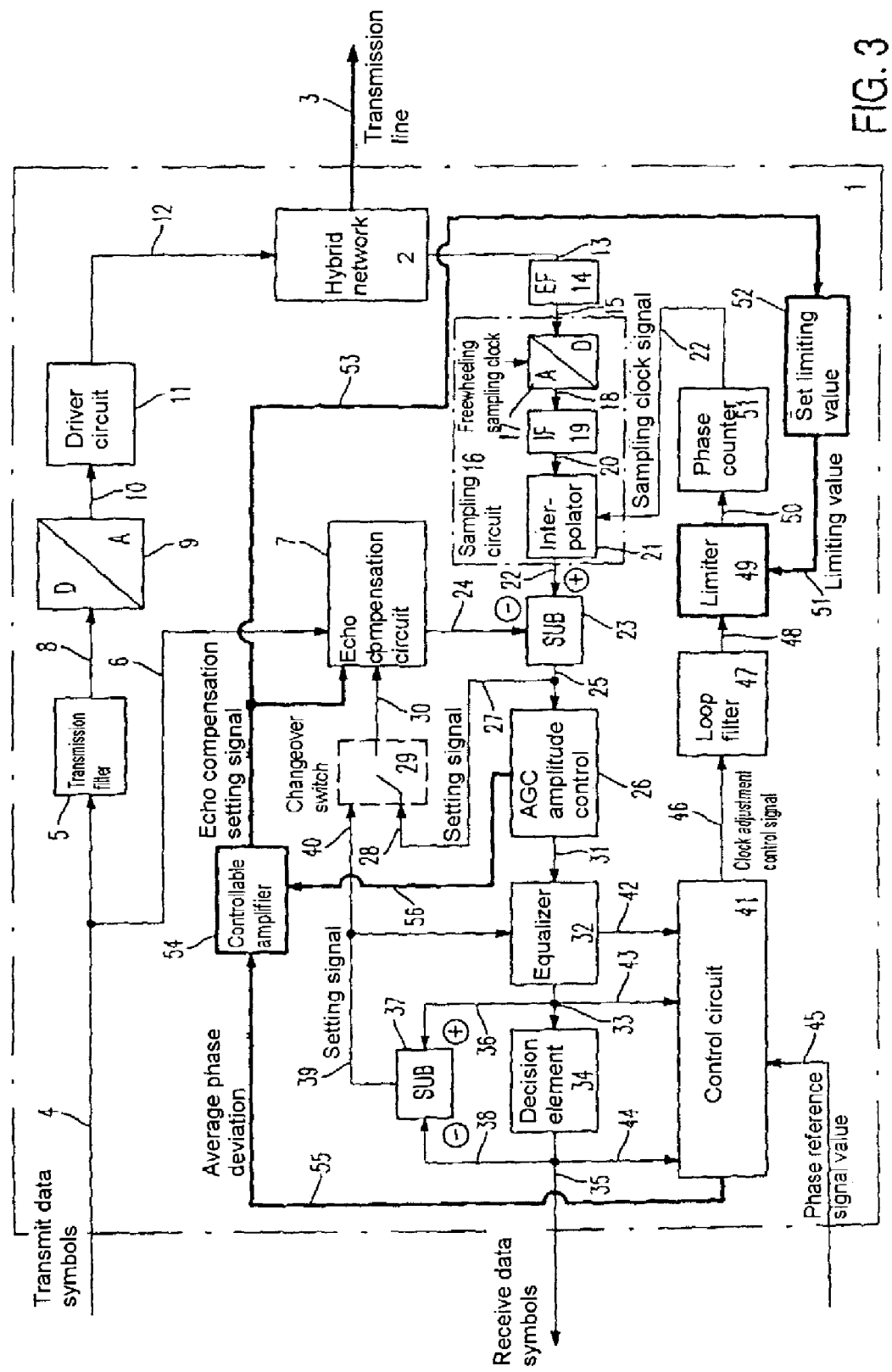
FIG. 3 shows a block circuit diagram of a preferred embodiment of a transceiver with the clock phase control circuit according to the invention.

FIG. 3 shows a transceiver 1 which contains the clock phase control circuit according to the invention. The transceiver 1 is connected to a data transmission line 3 via a hybrid network 2. The transceiver 1 receives an analog received signal from another transceiver via the data transmission line 3. Furthermore, the transceiver 1 transmits its own transmit signal via the data transmission line 3.

The transceiver 1 is composed of a transmit signal path and a received signal path. The transceiver 1 receives transmit data symbols from a data source via a data line 4, said transmit data symbols being fed to a digital transmission filter 5. The incoming transmit data symbols are also applied via a line 6 to an echo compensation circuit 7 contained in the transceiver 1. A digital-to-analog converter 9 is connected downstream of the transmission filter 5 via a line 8. The digital-to-analog converter 9 converts the filtered transmit data into an analog transmit signal and outputs it to a driver circuit 11 within the transceiver 1 via a line 10. The driver circuit 11 amplifies the applied analog transmit signal and applies the amplified signal to the hybrid network 2 via a line 12. The hybrid network, 2 outputs the amplified transmit signal to the remote transceiver via the data transmission line 3. The digital transmission filter 5, the digital-to-analog converter 9 and the driver circuit 11 form the transmit signal path within the transceiver 1.

The transceiver 1 receives an analog received signal from the remote transceiver via the data transmission line 3, this received signal being applied to an analog reception filter 14 via a line 13. Furthermore, an undesired echo signal is fed in owing to the actual transmit signal of the transceiver 1 itself and is applied to the analog reception filter 14. The composite received signal is output via a line 15 to a sampling circuit 16 within the transceiver 1. The sampling circuit 16 firstly contains an analog-to-digital converter 17 which operates with a freewheeling working clock signal. The analog-to-digital converter 17 converts the analog received signal into a digital received signal and outputs it to a downstream interpolation filter 19 via a line 18. An interpolator circuit 21 is connected downstream of the interpolation filter 19 via a line 20. The interpolator 21 is supplied with a controlled sampling clock signal via a line 22. A largely freely selectable chronological resolution of the sampling phase can be achieved by means of the sampling using the interpolator 21.

A first subtractor 23 is connected downstream of the interpolator 21 at the output end via a line 22. The subtractor 23 subtracts, from the sampled received signal, the echo compensation signal which is calculated by the echo compensation circuit 7. The compensation signal is fed to the subtractor 23 via a line 24. The fed-in echo signal is very largely compensated by the echo compensation signal. For this purpose, the echo compensation circuit 7 calculates, from the applied transmit data symbols, the most precise possible estimated value for the expected echo signal and outputs this estimated value as an echo compensation signal to the subtractor 23 via the line 24. The echo-compensated received signal is output to an amplitude control circuit 26 by the subtractor 23 via a line 25. The amplitude control circuit 26 is composed of a multiplier which multiplies the signal by a controlled gain value. The echo-compensated difference signal which is output by the subtractor 23 is also applied to an input 28 of a controllable changevia switch 29 via a line 27. The echo-compensated signal can be applied to the echo compensation circuit 7 by the changevia switch 29 via a line 30, in which case it is used as a fault criterion or deviation criterion for setting the echo compensation circuit 7.

The received signal which is controlled by the amplitude control circuit 26 is applied to an equalizer 32 via a line 31. In a first embodiment, the equalizer 32 is a linear equalizer, and in a second embodiment it is a combination of a linear equalizer and a decision feedback equalizer. The equalized received signal is output to a decision element 34 via a line 33. The decision element 34 forms, from the equalized received signal value, an estimated value for the originally received data symbol and outputs it to a data sink via a line 35 for further data processing. The connecting line between the equalizer 32 and the decision element 34 is connected to a subtractor 37 via a line 36. The other input of the subtractor 37 is connected to the output line 35 of the decision element 34 via a line 38. The subtractor 37 forms a difference signal between the signal value upstream and downstream of the decision element 34 and outputs this difference signal as a fault signal or setting signal via a line 39. The line 39 is connected to a second input 40 of the changeover switch 29 and can be connected through as a setting signal to the echo compensation circuit 7. The difference signal which is output by the subtractor 37 is used here as a fault signal for setting the echo compensation circuit 7 and the equalizer 32.

A clock adjustment control signal is generated or calculated by means of a control circuit 41 in order to control the sampling phase of the sampling clock signal, applied to the line 22, for the sampling circuit 16. For this purpose, the control circuit 41 is connected to the equalizer 32 via a line 42 and the coefficients of the equalizer 32 are read out via the line 42. Furthermore, the control circuit 41 is connected, via a line 43, to the connecting line 33 between the equalizer 32 and the decision element 34. The output of the decision element 34 is also connected to the control circuit 41 via a line 44. The control circuit 41 has a further input for receiving a phase reference signal value via a line 45. The control circuit 41 calculates a clock adjustment control signal from the sampled signal values upstream and downstream of the decision element in a decision-fed-back controller, and also from at least one of the coefficients of the linear equalizer 32. A possible generation of the clock adjustment control signal is described in the patent application with the official file number DE 100 25 566.3.

The clock adjustment control signal which is generated by the control circuit 41 is output to a downstream digital loop filter 47 via a control line 46. The loop filter 47 filters the clock adjustment control signal and outputs a filtered control signal to an amplitude limiting circuit 49 via a line 48. The amplitude limiting circuit 49 limits the signal amplitude of the controlled signal and outputs the amplitude-limited control signal to a phase counter 51 via a line 50. The phase counter 51 is connected at the output end to the interpolator 21 via the control line 22 and supplies it to the controlled sampling clock signal.

The limiting value for the amplitude limiting circuit 49 is made available by a limiting value setting circuit 52 via a line 51. This limiting value setting circuit 52 receives an echo compensation setting signal for the echo compensation circuit 7 from a controllable amplifier 54 via a line 53. The controllable amplifier 54 is connected at the input end to the control circuit 41 via a line 55. The control circuit 41 calculates the phase deviation, averaged over time, between the phase of the sampling clock signal and the phase reference signal value applied via the line 45, in order to generate an averaged phase deviation signal which is applied to the controllable amplifier 54 via the line 45. The controllable amplifier 54 amplifies the average phase deviation signal as a function of a gain setting signal which is fed to it via a line 56, to form an echo compensation setting signal. The echo compensation setting signal is used as a manipulated variable for the echo compensation circuit 7 and is additionally fed to the limiting value setting circuit 52 via the line 53. The limiting value is set by the limiting value setting circuit 52 in accordance with the instantaneous manipulated variable of the echo compensation circuit 7, the limiting value for the amplitude limiting circuit 49 also increasing as the manipulated variable rises or echo compensation setting signal increases. As the echo compensation setting value rises, the echo compensation circuit 7 is set more quickly, i.e. the setting time of the echo compensation circuit 7 is reduced. During the quicker setting of the echo compensation circuit 7, higher intrinsic noise of the echo compensation circuit 7 is tolerated. The simultaneously increased limiting value ensures that the sampling phase of the sampling phase control circuit is changed only at the speed at which the echo compensation circuit 7 adapts to the changed sampling phase.

The clock phase control circuit according to the invention is distinguished by the coupling of the sampling phase control circuit to the setting of the echo compensation circuit 7. As the echo compensation setting value rises, the limiting value for the amplitude limiting circuit 49 increases so that faster setting of the sampling phase is possible. At the same time, the rising echo compensation setting signal brings about faster setting of the echo compensation circuit 7, higher intrinsic noise of the echo compensation circuit 7 being tolerated. The control of the sampling phase is thus performed in such a way that the echo compensation circuit 7 can always follow, i.e. the setting time is correspondingly adjusted.

In order to ensure the fastest possible run-in time, the echo compensation setting signal is controlled as a function of the phase angle by setting the controllable amplifier 54. When there is a large phase store [sic] or phase deviation, the manipulated variable or the echo compensation setting signal for the echo compensation circuit 7, and thus also the limiting value for the amplitude limiting circuit 49, are set to large values. This brings about a faster change in the clock phase. When the phase store [sic] drops or phase deviation decreases, the echo compensation setting signal and the limiting value for the amplitude limiting circuit 49 are correspondingly reduced, and after the optimum sampling phase has been reached in accordance with the predefined phase reference signal value, the echo compensation setting signal value remains constant.

As a result of the clock phase control circuit coupled according to the invention, after a phase change it is not necessary to reset the echo compensation circuit 7 as the sampling phase is changed only with the speed at which the echo compensation circuit 7 adapts to the changed sampling phase. The clock phase control is carried out until the phase deviation between the signal phase of the sampling clock signal and a setpoint signal phase of an ideal sampling clock signal is at a minimum. The ideal sampling clock signal leads, for example, to a maximum signal-to-noise ratio SNR of the received signal.

Figure 4:
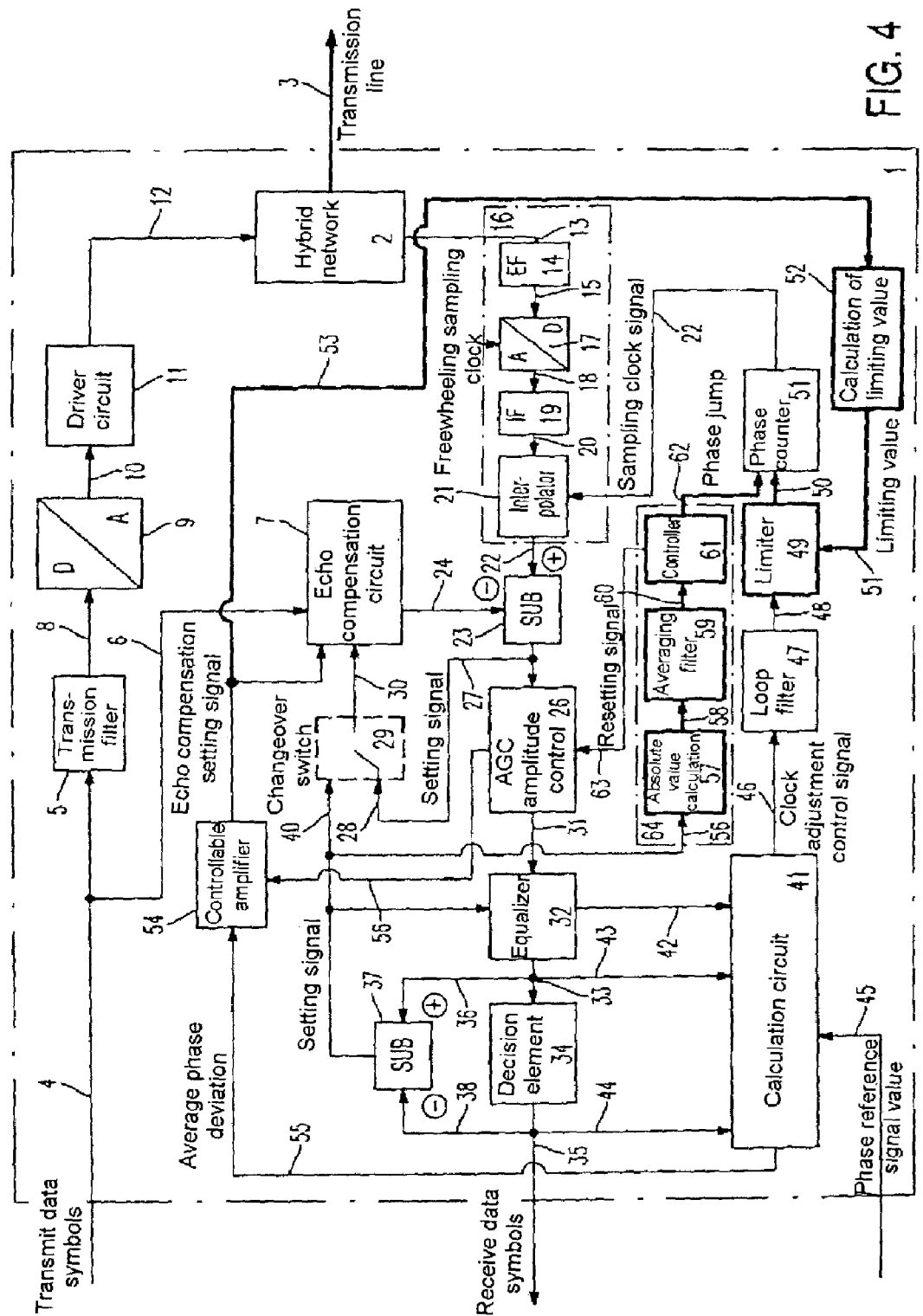
FIG. 4 shows a further preferred embodiment of the clock phase control circuit according to the invention.

FIG. 4 shows a particularly preferred embodiment of the clock phase control circuit according to the invention with an additional protection circuit for avoiding incorrect synchronizations. In the case of an unfavorable reception sampling phase, which is dependent on the data transmission line, an equalizer run-in or transient response of the equalizer 32 may not be able to occur. In order to avoid incorrect synchronization, the fault which is determined from the signal values upstream and downstream of the decision element 34 is monitored. For this purpose, the difference signal which is formed by the subtractor 37 is fed to a calculation circuit 57 via a line 56. The calculation circuit calculates the absolute value or the square of the fault or difference value. To [sic] an averaging filter 59 is connected downstream of the calculation circuit 57 via a line 58. The filtered signal is fed to a monitoring circuit 61 via a line 60. The monitoring circuit 61 checks whether the absolute mean value of the fault does not drop below a specific threshold value within a predetermined time period. The monitoring circuit 61 actuates the phase counter 51 to adjust the phase sampling signal by a predefined phase jump value if the difference signal averaged by means of the averaging filter 59 does not drop below the settable threshold value during a specific time period. For this purpose, the monitoring circuit 61 outputs a corresponding control signal to the phase counter 51 via a control line 62. If the absolute mean value of the fault does not drop below the specific threshold value within the predetermined time period, an unfavorable starting phase is set and a predefined phase jump, for example from half a symbol period, has to take place. In order to set the echo compensation circuit 7 quickly, the amplitude control circuit is simultaneously reset to zero by means of a resetting line 63. The amplitude control value is reset with the new sampling phase. If convergence of the equalizer 32 still does not occur after the phase jump has taken place, the procedure can be repeated in a further defined phase jump, for example a quarter data symbol period. The calculation circuit 57, the averaging filter 59 and the monitoring circuit 61 form together a protection circuit 64 for avoiding incorrect synchronization.

LIST OF REFERENCE NUMBERS

1 Transceiver
2 Hybrid network
3 Data transmission line
4 Data line
5 Transmission filter
6 Line
7 Echo compensation circuit
8 Line
9 Digital-to-analog converter
10 Line
11 Driver circuit
12 Line
13 Line
14 Reseption filter
15 Line
16 Sampling circuit
17 Analog-to-digital converter
18 Line
19 Interpolation filter
20 Line
21 Interpolator
22 Line
23 Subtractor
24 Line 25 Line
26 Amplitude controller
27 Line
28 Imput
29 Changeover switch
30 Line
31 Line
32 Equalizer
33 Line
34 Decision element
35 Line
36 Line
37 Subtractor
38 Line
39 Line
40 Imput
41 Control circuit
42 Line
43 Line
44 Line
45 Line
46 Line
47 Loop filter
48 Line
49 Amplitude limiting circuit
50 Line
51 Setting Line
52 Limiting value setting circuit
53 Line
54 Controllable amplifier
55 Line
56 Line
57 Calculation circuit
58 Line
59 Averaging filter
60 Line
61 Monitoring circuit
62 Line
63 Resetting line
64 Protection circuit

What is claimed is:

1. Clock phase control circuit for controlling the clock phase of a transceiver, having
   (a) a sampling circuit for sampling an analogue received signal with a sampling clock signal;
   (b) an echo signal compensation circuit for compensating an echo signal which is produced by means of a transmit signal transmitted by the transceiver, it being possible to set the echo signal compensation circuit in an adaptive fashion as a function of a setting signal;
   (c) a control circuit for generating a control signal for controlling the clock phase, which control signal specifies the phase deviation between the signal phase of the sampling clock signal and a setpoint signal phase of an ideal sampling clock signal;
   (d) a loop filter for filtering the control signal;
   (e) a phase counter for generating the sampling clock signal as a function of the filtered control signal, characterized in that
   (f) an amplitude limiting circuit is provided between the loop filter and the phase counter, which amplitude limiting circuit limits the amplitudes of the filtered control signal to a limiting value;
   (g) the limiting value depending on the setting signal for the echo signal compensation circuit.

2. Clock phase control circuit according to claim 1, wherein the sampling circuit has an analog-to-digital converter for converting the analog received signal into a digital received signal, a digital interpolation filter for filtering the digital received signal, and an interpolator for interpolating the filtered digital received signal.

3. Clock phase control circuit according to claim 2, wherein the analog-to-digital converter is clocked by means of a freewheeling working clock signal.

4. Clock phase control circuit according to claim 2, wherein the interpolator is clocked by means of the sampling clock signal.

5. Clock phase control circuit according to claim 2, wherein a digital output signal of the echo compensation circuit is subtracted from the filtered digital received signal by means of a subtractor in order to generate an echo-compensated digital received signal.

6. Clock phase control circuit according to claim 5, wherein an amplitude control circuit is provided for controlling the amplitude of the echo-compensated digital received signal.

7. Clock phase control circuit according to claim 5, wherein an equalizer is provided for equalizing the echo-compensated digital received signal.

8. Clock phase control circuit according to claim 7, wherein the equalizer is a linear equalizer.

9. Clock phase control circuit according to claim 7, wherein the equalizer is a decision feedback equalizer.

10. Clock phase control circuit according to claim 7, wherein a decision element is connected downstream of the equalizer and generates an estimated value for the received signal from the equalized digital received signal.

11. Clock phase control circuit according to claim 10, wherein a second subtractor is provided which subtracts the generated estimated value from the equalized digital received signal in order to form a difference signal which is provided for setting the echo signal compensation circuit.

12. Clock phase control circuit according to claim 1, wherein the control circuit calculates a phase deviation, averaged over time, between the phase of the sampled signal and a phase reference value in order to generate a phase deviation signal.

13. Clock phase control circuit according to claim 12, wherein a controllable amplifier is provided which amplifies the phase deviation signal as a function of an amplification setting signal in order to generate the setting signal for the echo compensation circuit.

14. Clock phase control circuit according to claim 13, wherein the amplification setting signal is output by an amplitude control circuit.

15. Clock phase control circuit according to claim 1, wherein the limiting value for the amplitude limiting circuit is calculated by means of a calculation circuit as a function of the setting signal for the echo compensation circuit, the limiting value being raised as the setting signal value increases.

16. Clock phase control circuit according to claim 1, wherein a protection circuit is provided for avoiding an incorrect synchronization, which protection circuit contains an absolute value calculation circuit for calculating the absolute value of the difference signal, a downstream averaging filter and a monitoring circuit, the monitoring circuit actuating the phase counter in order to adjust the phase of the sampling signal by a predefined phase jump if the difference signal averaged by means of the averaging filter does not drop below an adjustable threshold value during a specific time period.

* * * * *